United States Patent
Kim et al.

(10) Patent No.: US 12,056,858 B2
(45) Date of Patent: Aug. 6, 2024

(54) HOLE FILLING METHOD FOR PROVIDING VIRTUAL THREE-DIMENSIONAL MODEL AND COMPUTING DEVICE THEREFOR

(71) Applicant: 3i Inc., Daegu (KR)

(72) Inventors: Ken Kim, Seoul (KR); Ji Wuck Jung, Gyeonggi-do (KR); Farkhod Rustam Ugli Khudayberganov, Seoul (KR)

(73) Assignee: 3I INC., Daegu (KR)

( * ) Notice: Subject to any disclaimer, the term of this patent is extended or adjusted under 35 U.S.C. 154(b) by 343 days.

(21) Appl. No.: 17/547,202

(22) Filed: Dec. 9, 2021

(65) Prior Publication Data
US 2023/0112494 A1    Apr. 13, 2023

(30) Foreign Application Priority Data

Oct. 8, 2021    (KR) .......................... 10-2021-0134224

(51) Int. Cl.
*G06T 5/77*    (2024.01)
*G06N 3/08*    (2023.01)
(Continued)

(52) U.S. Cl.
CPC ................ *G06T 5/77* (2024.01); *G06N 3/08* (2013.01); *G06T 17/00* (2013.01); *G06V 10/771* (2022.01);
(Continued)

(58) Field of Classification Search
CPC ..................... G06T 5/005; G06T 17/00; G06T 2207/10024; G06T 2207/10028;
(Continued)

(56) References Cited

U.S. PATENT DOCUMENTS

| | | | |
|---|---|---|---|
| 6,342,886 B1 * | 1/2002 | Pfister | ..................... G06T 13/20 |
| | | | 345/619 |
| 10,290,085 B2 | 5/2019 | Lin et al. | |

(Continued)

FOREIGN PATENT DOCUMENTS

CN    110580687    12/2019

OTHER PUBLICATIONS

Office Action dated Oct. 17, 2022 for Korean Patent Application No. 10-2021-0134224 and its English translation from Global Dossier.

(Continued)

*Primary Examiner* — John B Strege
(74) *Attorney, Agent, or Firm* — Ladas & Parry, LLP

(57) ABSTRACT

A hole filling method for providing a virtual three-dimensional (3D) model, the hole filling method being executable on a computing device and including: acquiring an original learning image and a hole generation learning image for the original learning image, wherein the hole generation learning image is an image in which at least one hole is generated based on the original learning image; generating a hole filling learning image by performing hole filling on the hole generation learning image by using a neural network; performing a spherical transformation on each of the hole filling learning image and the original learning image; and training the neural network based on a difference between the spherically-transformed hole filling learning image and the spherically-transformed original learning image.

15 Claims, 15 Drawing Sheets

(51) Int. Cl.
  *G06T 17/00* (2006.01)
  *G06V 10/771* (2022.01)
  *G06V 20/20* (2022.01)
(52) U.S. Cl.
  CPC .... *G06V 20/20* (2022.01); *G06T 2207/10024* (2013.01); *G06T 2207/10028* (2013.01); *G06T 2207/20081* (2013.01); *G06T 2207/20084* (2013.01)
(58) Field of Classification Search
  CPC . G06T 2207/20081; G06T 2207/20084; G06T 3/0062; G06T 19/003; G06N 3/08; G06V 10/771; G06V 20/20; H04N 23/698
  See application file for complete search history.

(56) References Cited

U.S. PATENT DOCUMENTS

| | | | | |
|---|---|---|---|---|
| 2018/0165798 | A1* | 6/2018 | Lin | G06N 3/045 |
| 2018/0174276 | A1* | 6/2018 | Michel | G06F 18/23213 |
| 2019/0114748 | A1* | 4/2019 | Lin | G06T 5/20 |
| 2019/0228508 | A1* | 7/2019 | Price | G06T 7/337 |
| 2019/0355102 | A1* | 11/2019 | Lin | G06T 5/77 |
| 2022/0215232 | A1* | 7/2022 | Pardeshi | G06N 3/006 |
| 2023/0131366 | A1* | 4/2023 | Bigos | G06T 5/77 |
| | | | | 382/275 |

OTHER PUBLICATIONS

Yongrui Li et al. : "A Hole-Filling Method for DIBR Based on Convolutional Neural Network", 2018 Conference on Lasers and Electro-Optics Pacific Rim (CLEO-PR), Jul. 29-Aug. 3, 2018.

Fenqiang Zhao et al. : "S3Reg: Superfast Spherical Surface Registration Based on Deep Learning", IEEE Transactions on Medical Imaging, vol. 40, Issue: 8, Aug. 2021.

Seo Woo Han et al. : "PIINET: a 360-degree Panoramic Image Inpainting Network Using a Cube Map", Electrical Engineering and Systems Science_Image and Video Processing, arXiv: 2010.16003, Jan. 26, 2021.

* cited by examiner

901

300

HOLE FILLING METHOD FOR PROVIDING VIRTUAL THREE-DIMENSIONAL MODEL AND COMPUTING DEVICE THEREFOR

CROSS-REFERENCE TO RELATED APPLICATION

This application is based on and claims priority under 35 U.S.C. § 119 to Korean Patent Application No. 10-2021-0134224, filed on Oct. 8, 2021, in the Korean Intellectual Property Office, the disclosure of which is incorporated by reference herein in its entirety.

BACKGROUND

1. Field

One or more embodiments relate to a hole filling technology for providing a virtual three-dimensional model for an indoor space.

2. Description of the Related Art

Recently, a virtual space realization technology that allows users to experience a real space as if they are in the real space without directly visiting the real space by receiving an online virtual space corresponding to the real space has been developed.

The real space-based virtual technology is a technology for implementing a digital twin or metaverse and has been developed in various ways.

In order to realize such a virtual space, a process of providing a virtual space by acquiring a planar image captured in a real space and implementing and generating a stereoscopic virtual image, i.e., a three-dimensional (3D) model, based on the planar image is required.

The 3D model is generated based on data obtained by photographing an indoor space. In this case, in order to configure the 3D model, 360-degree omnidirectional data needs to be acquired at each point in the indoor space. Thus, there is a limitation in that special equipment such as a multi-angle camera device or the like needs to be used to obtain an omnidirectional image.

Also, a noise space is generated by unintentional subjects such as passers-by. When the noise space is removed, a hole with empty data may be generated in the 3D model.

PRIOR ART DOCUMENTS

Patent Documents

U.S. Pat. Publication No. 10,290,085

SUMMARY

One or more embodiments include a hole filling technology for providing a virtual three-dimensional (3D) model for an indoor space, whereby hole filling is performed on a panoramic image used to configure a virtual 3D model.

One or more embodiments include a hole filling technology for providing a virtual three-dimensional (3D) model for an indoor space, whereby training is performed according to a spherically-transformed state so that hole filling may be more accurately performed on a panoramic image than when used in the virtual 3D model.

One or more embodiments include a hole filling technology for providing a virtual three-dimensional (3D) model for an indoor space, whereby, even when an unnecessary object such as a person is deleted in configuring a virtual 3D model for an existing indoor space, a hole generated thereby may be efficiently and accurately filled.

Problems of the present application are not limited to problems mentioned above, and other unmentioned problems will be clearly understood by those skilled in the art from the following description.

Additional aspects will be set forth in part in the description which follows and, in part, will be apparent from the description, or may be learned by practice of the presented embodiments of the disclosure.

According to one or more embodiments, there is provided a hole filling method for providing a virtual three-dimensional (3D) model. The hole filling method for providing a virtual 3D model, the hole filling method being executable on a computing device may include acquiring an original learning image and a hole generation learning image for the original learning image, wherein the hole generation learning image is an image in which at least one hole is generated based on the original learning image, generating a hole filling learning image by performing hole filling on the hole generation learning image by using a neural network, performing a spherical transformation on each of the hole filling learning image and the original learning image, and training the neural network based on a difference between the spherically-transformed hole filling learning image and the spherically-transformed original learning image.

According to one or more embodiments, there is provided a computing device. The computing device may include a memory storing one or more instructions, and a processor configured to execute the one or more instructions stored in the memory, wherein the processor is configured to execute the one or more instructions to acquire an original learning image and a hole generation learning image for the original learning image, wherein the hole generation learning image is an image in which at least one hole is generated based on the original learning image, to generate a hole filling learning image by performing hole filling on the hole generation learning image by using a neural network, to perform spherical transformation on each of the hole filling learning image and the original learning image, and to train the neural network based on a difference between the spherically-transformed hole filling learning image and the spherically-transformed original learning image.

According to one or more embodiments, there is provided a storage medium. The storage medium may be a storage medium on which computer-readable instructions are stored. When the computer-readable instructions are executed by the computing device, the computer-readable instructions may allow the computing device to perform operations of acquiring an original learning image and a hole generation learning image for the original learning image, wherein the hole generation learning image is an image in which at least one hole is generated based on the original learning image, generating a hole filling learning image by performing hole filling on the hole generation learning image by using a neural network, performing a spherical transformation on each of the hole filling learning image and the original learning image, and training the neural network based on a difference between the spherically-transformed hole filling learning image and the spherically-transformed original learning image.

Means for solving the above problems do not enumerate all the features of the present application. Various means for solving the problems of the present application may be understood in more detail with reference to specific embodiments of the detailed description below.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
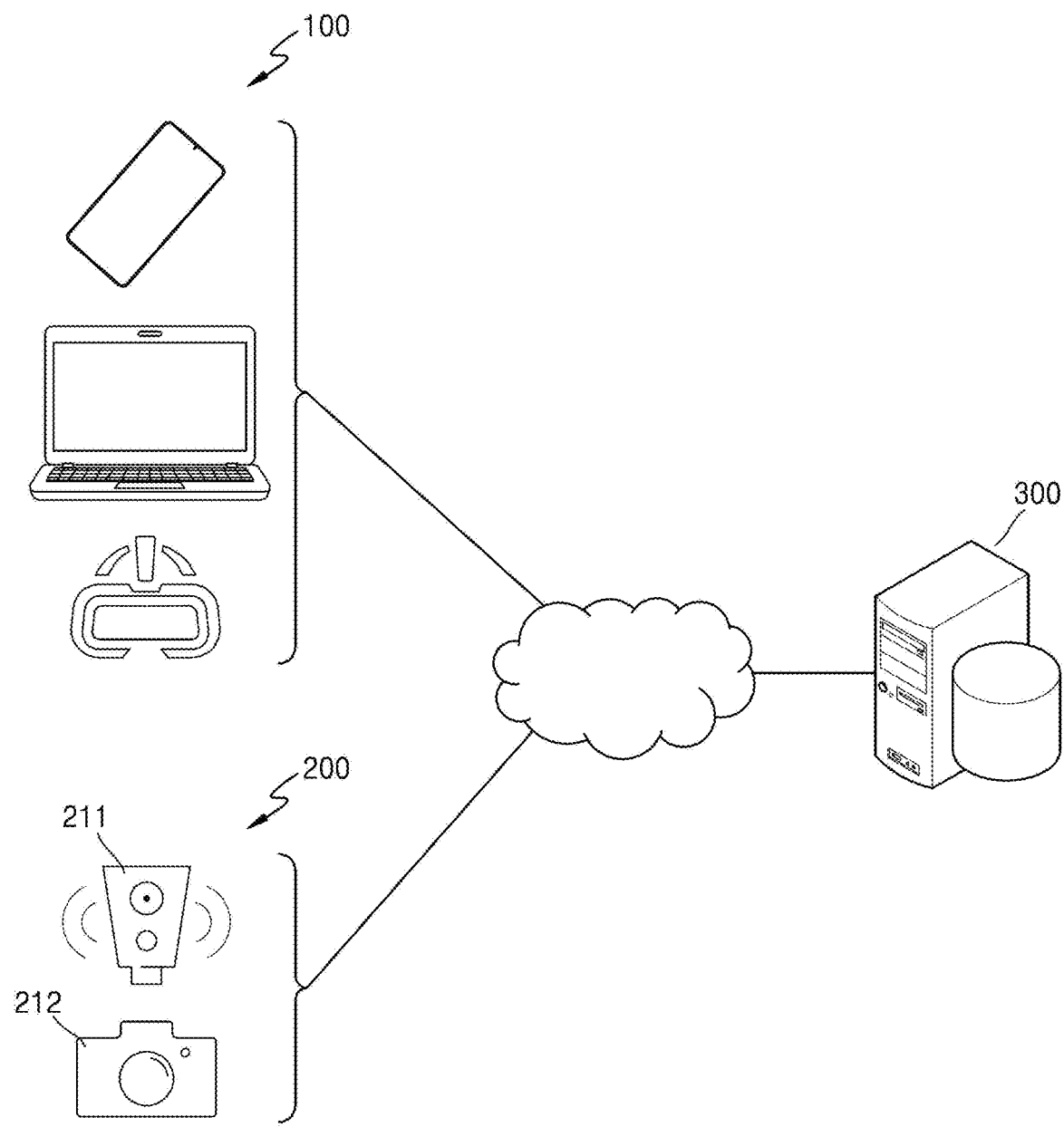
FIG. 1 is an example of a drawing for describing a system for providing a hole filling method for providing a virtual three-dimensional (3D) model according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the present disclosure will be described with reference to the accompanying drawings.

However, this is not intended to limit the scope of specific embodiments, and should be understood to include various modifications, equivalents, and/or alternatives of the embodiments of the present disclosure.

In the description of the present disclosure, if it is determined that the detailed description of commonly-used functions or configurations may unnecessarily obscure the subject matter of the present disclosure, the detailed description will be omitted.

The terms used herein are used to describe only a specific embodiment but is not intended to limit the scope of rights. The singular forms "a," "an" and "the" are intended to include the plural forms as well, unless the context clearly indicates otherwise.

It will be further understood that the terms "have," "having," "comprises," or "comprising" used herein specify the presence of stated features or components, but do not preclude the presence or addition of one or more other features or components.

With respect to the description of the drawings, like reference numerals may be used for similar to related components. The singular form of a noun corresponding to an item may include one or more of the item, unless the relative context clearly dictates otherwise. In the present application, each of phrases such as "A or B," "at least one of A and B," "at least one of A or B," "A, B or C," "at least one of A, B, and C," and "at least one of A, B or C" may include any one of items listed together with a corresponding phrase of the phrases, or all possible combinations thereof.

It will be understood that the terms "first", "second", etc. may be used herein to simply distinguish a corresponding component from other components and do not limit corresponding components in another aspect (for example, importance or order).

It will be understood that when a (e.g., a first) component is referred to as being "coupled to," "connected to," or "linked with" other (e.g., a second) component with or without the term "functionally" or "communicatively", the component may be directly connected to the other component or may be connected to the other component through a third component.

The expression "configured to (or set to)" as used in the present disclosure, depending on the context, may be replaced with, for example, "suitable for," "having the capacity to," "designed to," "adapted to," "made to," or "capable of". The term "configured to (or set to)" may not mean only "specifically designed to" in hardware.

Instead, in some circumstances, the expression "a device configured to" means that the device is "capable of" in conjunction with other devices or parts. For example, the phrase "a processor configured (or configured to perform) A, B, and C" may refer to a dedicated processor (e.g., an embedded processor) for performing corresponding operations, or a generic-purpose processor (e.g., a Central Processing Unit (CPU) or an Application Processor (AP) capable of performing corresponding operations by executing one or more software programs stored in a memory device.

In an embodiment, a 'module' or 'unit' performs at least one function or operation, and may be implemented as hardware or software, or a combination of hardware and software. Also, a plurality of 'modules' or a plurality of 'units' may be integrated into at least one module and implemented with at least one processor except for a 'module' or a 'unit' that needs to be implemented with specific hardware.

Various embodiments of the present application include software (e.g., a program) including one or more instructions stored in a storage medium readable by a machine—for example, a user terminal 100 or a computing device 300. For example, the processor 301 may call at least one of the one or more instructions stored from the storage medium and execute the at least one instruction. This enables the device to be operated to perform at least one function according to the called at least one instruction. The one or more instructions may include codes generated by a compiler or codes executable by an interpreter. The device-readable storage medium may be provided in the form of a non-transitory storage medium. Here, 'non-transitory' refers to a device in which the storage medium is tangible and signals (e.g., electromagnetic waves) are not included, and this term does not distinguish between a case in which data is semi-permanently stored in a storage medium and a case in which data is temporarily stored.

Various flowcharts to describe embodiments of the present application is disclosed, but this is for convenience of description of each step or operation, and each step is not necessarily performed according to the order of the flowchart. That is, each step in the flowchart is performed simultaneously with each other, the order according to the flowchart, or in an order opposite to the order in the flowchart.

Virtual three-dimensional (3D) models can be generated based on scans of architectural spaces (e.g., houses, construction sites, office spaces, etc). Oftentimes, 3D models generated based on scans of architectural spaces comprise large amounts of data (e.g., data points, polygons, textures, etc).

FIG. 1 is an example of a drawing for describing a system for providing a hole filling method for providing a virtual three-dimensional (3D) model according to an embodiment.

The system for providing a hole filling method for providing a virtual 3D model may include a user terminal 100, an image acquisition device 200, and a computing device 300.

The user terminal 100 may be an electronic device that a user may use to access the computing device 300, for example, a mobile phone, a smartphone, a laptop computer, a digital broadcasting terminal, a personal digital assistants (PDA), a portable multimedia player (PMP), a navigation device, a personal computer (PC), a tablet PC, an ultrabook, a wearable device (e.g., a watch-type terminal (smartwatch), a glass-type terminal (smart glass), head mounted display (HMD), etc. However, besides, the user terminal 100 may include an electronic device used in Virtual Reality (VR) or Augmented Reality (AR).

The image acquisition device 200 may be a device that generates a color image and a depth map image used to generate a spherical virtual image.

In the illustrated example, the image acquisition device 200 includes a distance measuring device 211 and an image capturing device 212. However, this is exemplary, and distance measurement and image capturing may also be performed by using one image acquisition device 200.

The image capturing device 212 may be a portable electronic device having an image capturing function and may generate a color image expressed with colors in a subject region (an image capturing region).

That is, in the present specification, the color image encompasses all of image expressed in colors, and is not limited to a specific expression method. Thus, the color image may be applied to various standards such as red green blue (RGB) images expressed in RGB as well as cyan magenta yellow key (CMYK) images expressed in CMYK.

The image capturing device 212 may include, for example, a mobile phone, a smartphone, a laptop computer, a PDA, a tablet PC, an ultrabook, a wearable device (e.g., a glass-type terminal (smart glass), or the like.

The distance measuring device 211 may be a device that may generate a depth map image by generating depth information in the subject region.

In the present specification, the depth map image may be an image including depth information for a subject space. For example, each pixel in the depth map image may be distance information from each point of the subject space captured at an image capturing point to a point corresponding to each pixel.

The distance measuring device 211 may include a certain sensor for distance measurement, for example, a LiDAR sensor, an infrared sensor, an ultrasonic sensor, or the like. Alternatively, the image capturing device 212 may include a stereo camera capable of measuring distance information by replacing a sensor, a stereoscopic camera, a 3D depth camera, or the like.

The image capturing device 212 may generate a color image, and the distance measuring device 210 may generate a depth map. The color image generated by the image capturing device 212 and the depth map image generated by the distance measuring device 211 may be generated in the same subject region on the same conditions (e.g., resolution, etc.) and may be matched with each other at a ratio of 1:1.

The distance measuring device 211 and the image capturing device 212 may generate a 360-degree panoramic image for an existing indoor space, i.e., a depth map panoramic image and a color panoramic image, respectively, and may provide the depth map panoramic image and the color panoramic image to the computing image 300.

The distance measuring device 211 and the image capturing device 212 may generate a depth map image and a color image for covering 360 degrees at several points in the indoor space and may provide the depth map image and the color image to the computing device 300. This is because, in order to provide a virtual space corresponding to the indoor space, it is to acquire 360-degree image sets each including a depth map image and a color image corresponding to each other 1:1 at several points in the indoor space.

The distance measuring device 211 may generate distance information on each of several points in the indoor space in which 360-degree capturing is performed. The distance information may be relative distance information. For example, the distance measuring device 211 may include a plan view for the indoor space and may receive an initial starting indoor point in the plan view according to the user's input. Subsequently, the distance measuring device 211 may generate relative distance movement information based on an image analysis and/or a movement detection sensor, for example, a 3-axis acceleration sensor and/or a gyro sensor. For example, the distance measuring device 211 may generate information on a second indoor point based on the relative distance movement information from the starting indoor point, and may generate information on a third indoor point based on relative distance movement information from the second indoor point. Generation of the distance information may be performed by the image capturing device 212.

Figure 2:
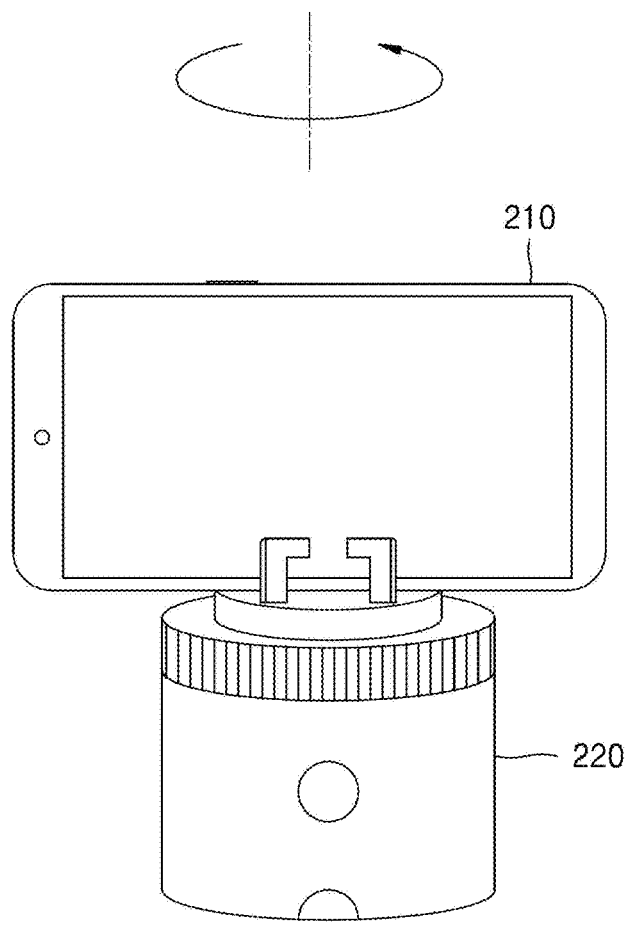
FIG. 2 is a view illustrating an example of an image acquisition technology for an indoor space for constructing a virtual 3D model according to an embodiment.

In an embodiment, the distance measuring device 211 and the image capturing device 212 may be implemented as one image acquisition device. For example, the image acquisition device 200 may be a smartphone including a camera for image acquisition and a LiDAR sensor for distance measurement. FIG. 2 illustrates an example of a case where the distance measuring device 211 and the image capturing device 212 are implemented as one integrated device 210. The integrated device 210 may be a device including a camera module for image capturing and a distance measuring module (e.g., a LiDAR module) for distance measurement, and for example, a smartphone including a LiDAR sensor and a camera.

The integrated device 210 may be fixed to a motorized rotation cradle 220, may rotate 360 degrees and may generate panoramic images, i.e., a color image and a depth map image. According to an embodiment, the integrated device 210 may acquire or receive and store information on the height on the ground by the mounting of the motorized rotation cradle 220 from the motorized rotation cradle 220, and may provide the information on the height to the computing device 300 together with the panoramic images. The information on the height on the ground may be an image capturing height and may be used to generate a 3D model in the computing device 300.

The depth map image and the color image may be a 360-degree panoramic image, and for convenience of explanation, the depth map image and the color image may be used. The depth map image and the color image may be a panoramic image having a suitable shape for providing a 360-degree image, for example, an equirectangular projection panoramic image.

The computing device 300 may generate a virtual 3D model that is a 3D virtual space corresponding to the indoor space by using the color image and the depth map image, which are respectively generated at several points in the indoor space. For example, a 360-degree color image and a 360-degree depth map image at each point in the indoor space may be used.

The computing device 300 may perform a hole filling operation for filling a hole present in the color image and the depth map image based on the neural network. The computing device 300 may perform hole filling on an image in a state before the virtual 3D model is generated, i.e., the color image and the depth map image. That is, hole filling may be performed on the image in the state before the 3D model is configured, so that resources required for hole filling may be reduced and hole filling may be quickly and efficiently performed.

The computing device 300 may perform a hole filling operation and may perform hole filling based on spherical transformation. For example, because the color image and/or the depth map image are used to constitute the virtual 3D model based on spherical transformation, hole filling may be performed by considering the implementation state into the virtual 3D model (not the panoramic image). Thus, the accuracy of hole filling may be increased.

The computing device 300 will be described below in more detail with reference to FIGS. 3 through 15.

Before describing each step of the hole filling process shown in FIG. 3, major terms to be used in the description of the present disclosure will be described. An 'electronic device' according to the present disclosure may be implemented not only as a server for providing a service related to a neural network model, but also as a user terminal such as a smartphone or a tablet PC. That is, any electronic device configured to perform hole filling based on a neural network according to the present disclosure may correspond to the electronic device of the present disclosure regardless of its type.

A neural network refers to a neural network model, and may be trained based on deep learning. In detail, the neural network model may include at least one artificial neural network of a deep neural network (DNN), a convolution neural network (CNN), a recurrent neural network (RNN), and generative adversarial networks (GAN). However, the neural network model according to the present disclosure is not limited to the above-described example.

Also, the color image or the depth map image may be a panoramic image. That is, the color image and/or the depth map image may be a two-dimensional panoramic image having a shape to be used for 3D transformation or spherical transformation, for example, an equirectangular projection image for spherical transformation.

Hereinafter, hole filling technologies according to various embodiments will be described with reference to FIGS. 3 through 12. Hereinafter, an original image to be learned is referred to as an 'original learning image,' an image in which a hole is generated for the original image, is referred to as a 'hole generation learning image,' and an image in which a hole for the hole generation learning image is filled by the neural network, is referred to as a 'hole filling learning image'. Also, a color image as well as a depth map image may be applied as the original learning image, the hole generation learning image, and the hole filling learning image. That is, a learning process using the neural network to be described below may be applied to both the color image and the depth map image.

Figure 3:
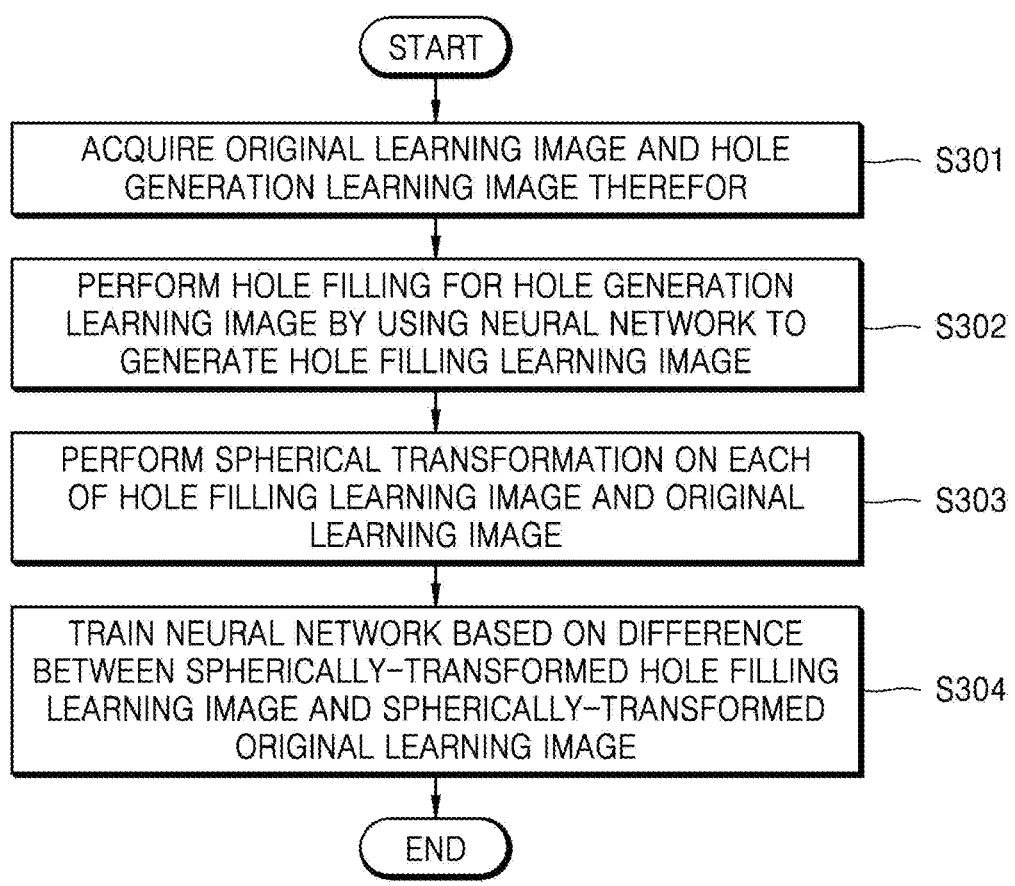
FIG. 3 is a view illustrating an architecture of a software module for performing hole filling according to an embodiment.

FIG. 3 is a view illustrating an architecture of a software module for performing hole filling according to an embodiment.

Referring to FIG. 3, the software module according to an embodiment may include a neural network model 320 and a training module 330. According to an embodiment, the software module may further include a learning data generation module 310.

The neural network model 320 may be a neural network model including an artificial neural network, as described above.

In an example, the neural network model 320 may use an activation function when performing a learning process and an inference process. In detail, the activation function may be configured to determine whether to transfer an input value transferred from the previous layers to next layers, or if the input value is transferred to the next layers, to convert the input value into an output value and transfer the converted input value. A gradient of the activation function may be used to update weight values (parameters) of each of layers included in the neural network model 320.

The training module 330 may be a module for acquiring evaluation information related to the learning performance of the neural network model 320.

For example, the training module 330 may acquire information on how many epochs the learning of the neural network model 320 has been performed, i.e., how many times the entire learning data has been learned. Also, the training module 330 may acquire information on a loss while the learning process is performed.

The learning data generation module 310 may be a module for generating learning data for performing hole filling learning. The learning data generation module 310 may receive the original learning image and may generate an arbitrary hole in the original learning image.

FIG. 3 illustrates a training process, and the learning data generation module 310 may receive the original learning image and may generate a hole generation learning image by generating an arbitrary hole in the original learning image. The learning data generation module 310 may provide the generated hole generation learning image to the neural network model 320. The neural network model 320 may perform hole filling treatment on the received hole generation learning image based on the learned content to generate a hole filling learning image. The training module 330 may compare the hole filling learning image generated in the neural network model 320 with the original learning image and change the weight values of the neural network model 320 according to a difference between two images, so that the neural network model 320 may be trained.

In this case, because the neural network model 320 has no learned content in an initial operation, a hole filling learning image may be generated based on a random value at each node of the neural network. The neural network model 320 may repeatedly perform feedback training caused by a difference between the hole filling learning image and the original learning image, thereby increasing the accuracy of hole filling treatment.

Each of the neural network model 320 for the color image and the neural network model 320 for the depth map image may be individually implemented. Because values for which hole filling is to be performed are different according to the type of an input image, the neural network model 320 may be provided and trained for each type of the input image.

Figure 4:
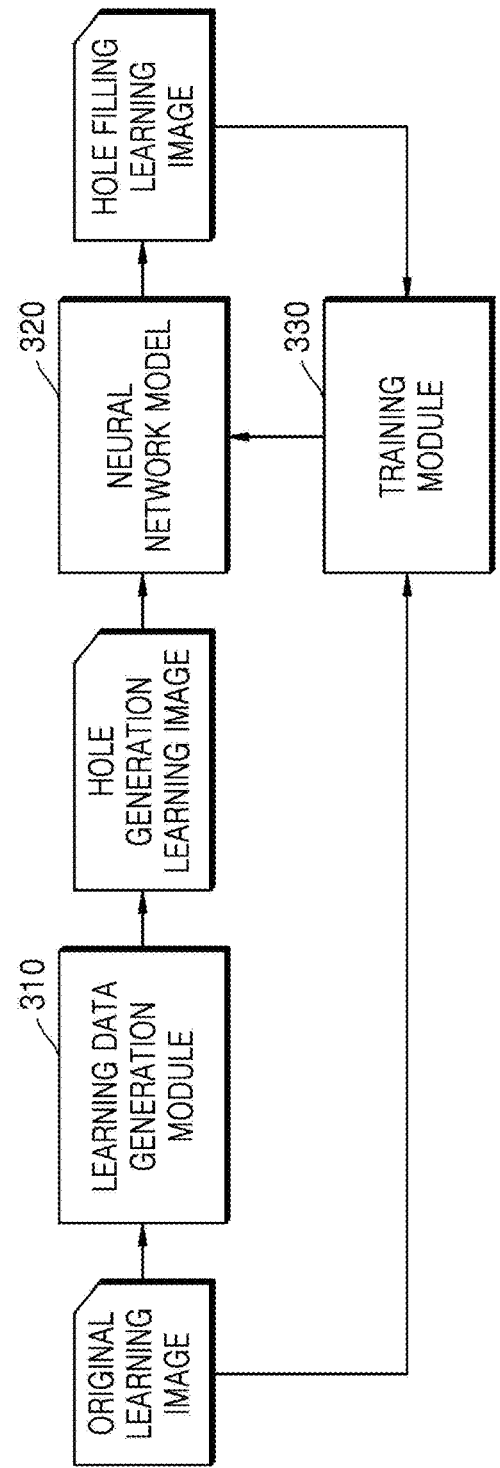
FIG. 4 is a flowchart for describing a hole filling process for providing a virtual 3D model according to an embodiment.

FIG. 4 is a flowchart for describing a hole filling process for providing a virtual 3D model according to an embodiment, and the hole filling process will be described by further referring to FIG. 4.

A software module according to an embodiment may acquire an original learning image and a hole generation learning image for the original learning image (S401). Here, the hole generation learning image may be an image in which at least one hole is generated based on the original learning image, for example, an image generated by the learning data generation module 310.

The neural network model 320 may perform hole filling by using the neural network on the received hole generation learning image to generate a hole filling learning image (S402).

The training module 330 may compare the hole filling learning image generated in the neural network model 320 with the original learning image and change the weight values of the neural network model 320 according to a difference between the two images so that the neural network model 320 may be trained.

The training module 330 may calculate a loss based on spherical transformation to change the weight values of the neural network model 320. That is, the training module 330 may spherically transform each of the hole filling learning image and the original learning image (S403) and may train the neural network model 320 based on a difference between the spherically-transformed hole filling learning image and the spherically-transformed original learning image (S404). This is because, since the hole-filled image is spherically-transferred as a color image or a depth map image and is used to generate a 3D model, an error occurs in comparing the hole filling learning image and the original learning image in a state before being spherically-transformed. That is, in order to increase the accuracy of learning after being implemented as the 3D model, after the training module 330 spherically-transforms each of the hole filling learning image and the original learning image, a loss between two image may be calculated, and training may be performed so that the accuracy of hole filling in the 3D model may be secured.

As described above, the hole generation learning image may be generated by the learning data generation module 310. Various embodiments of the learning data generation module 310 will be described with reference to FIGS. 5 through 9.

Figure 5:
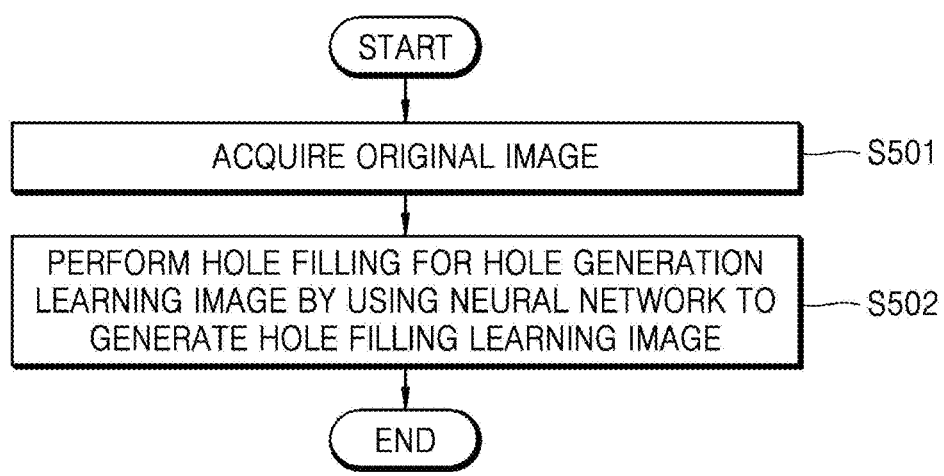
FIG. 5 is a flowchart for describing a process of generating a hole generation learning image according to an embodiment.

FIG. 5 is a flowchart illustrating a process of generating a hole generation learning image according to an embodiment.

Referring to FIG. 5, when the original learning image is received (S501), the learning data generation module 310 may generate an arbitrary hole in an upper region or a lower region to generate a hole generation learning image.

For example, the learning data generation module 310 may generate a hole by deleting or setting a color value or a distance value for an arbitrary hole region to a preset value (e.g., a value corresponding to a value identified as a hole)(S502).

Figure 7:
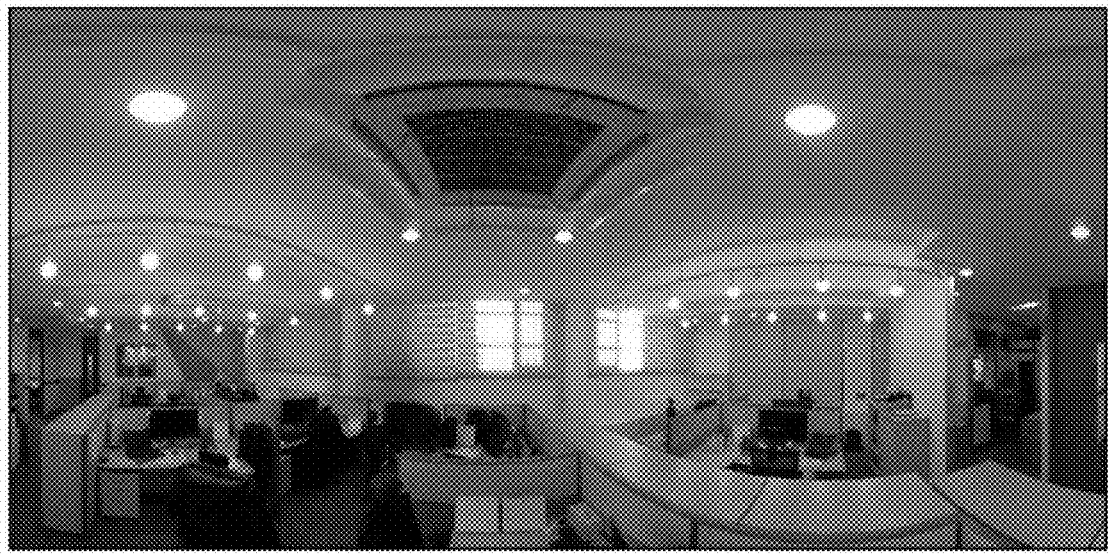
FIGS. 7 through 9 are views illustrating examples of hole generation learning image generation according to embodiments.
Figure 8:
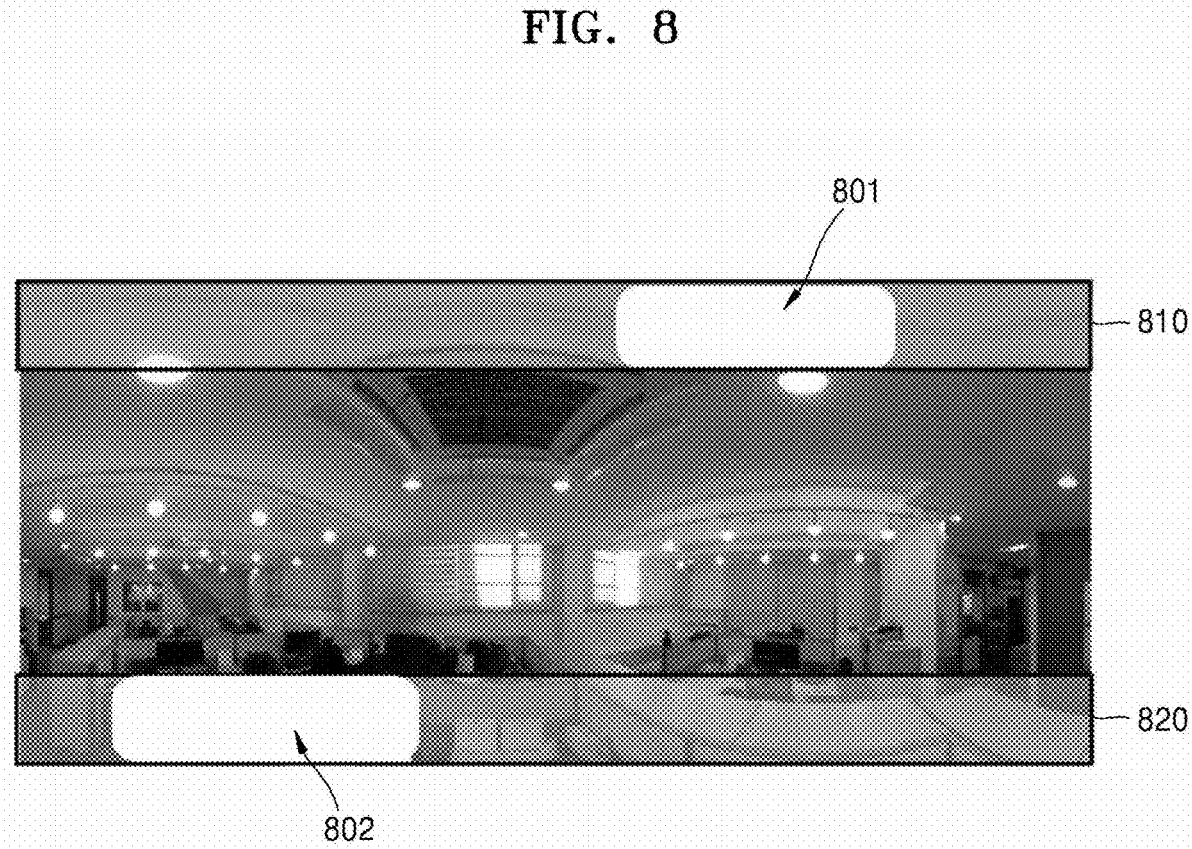

FIG. 7 illustrates an example of an original learning image, and FIG. 8 illustrates an example of a hole generation learning image in which holes 801 and 802 are generated by the learning data generation module 310 in an upper region 810 and a lower region 820.

The upper region 810 and the lower region 820 may be regions determined at a preset ratio in the entire image. The ratio of the upper region and the lower region may be determined to correspond to a non-display region in a 360-degree image obtained in the smartphone. That is, in the 360-degree image obtained in the smartphone, a non-display region is present in the upper and lower regions compared to an equirectangular projection panoramic image. This is because the equirectangular projection panoramic image is captured based on a wide-angle camera having a sufficient wide angle, wherein the 360-degree image (projected in an equirectangular projection) acquired from a smartphone is not. In the example of FIG. 8, the 360-degree image acquired in the smartphone may correspond to identification number 830. Thus, a hole may be generated in the upper region 810 and the lower region 820 through the learning data generation module 310, and the neural network model 320 may be trained based on the hole. Thus, even when the neural network model 320 receives the 360-degree image acquired from the smartphone, hole filling may be performed based on the received 360-degree image so that a complete equirectangular projection panoramic image may be output.

Figure 6:
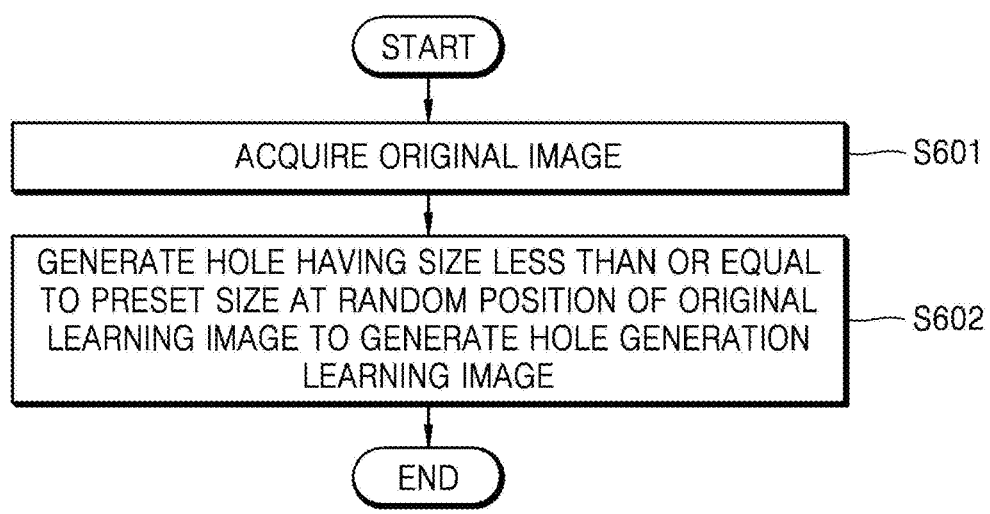
FIG. 6 is a flowchart for describing a process of generating a hole generation learning image according to another embodiment.

FIG. 6 is a flowchart illustrating a hole generation learning image generating process according to another embodiment.

Referring to FIG. 6, when the original learning image is received (S601), the learning data generation module 310 may generate a hole having a size less than or equal to a preset size at a random position of the original learning image to generate a hole generation learning image (S602).

Here, the learning data generation module 310 may generate a human-shaped hole as a hole having a size less than or equal to the preset size.

Figure 9:
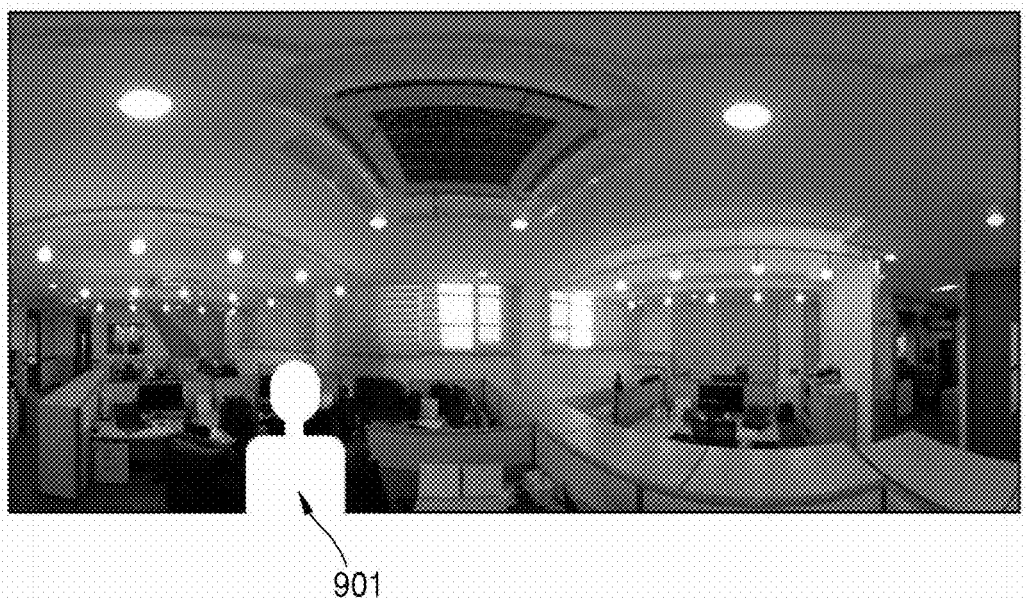

FIG. 7 illustrates an example of an original learning image, and FIG. 9 illustrates an example of a hole generation learning image in which the human-shaped hole 901 is generated by the learning data generation module 310. That is, the learning data generation module 310 may identify a human object in the original learning image based on learning data on the human object and may change the identified human object as a hole. In this embodiment, because, when a virtual space for an indoor space is generated, the shape of a person taken by change is only noise when a virtual space is created, a hole corresponding to the human shape may be generated, and training may be performed so that the neural network model 320 may be trained to increase the accuracy of hole filling for the human-shaped hole.

Figure 10:
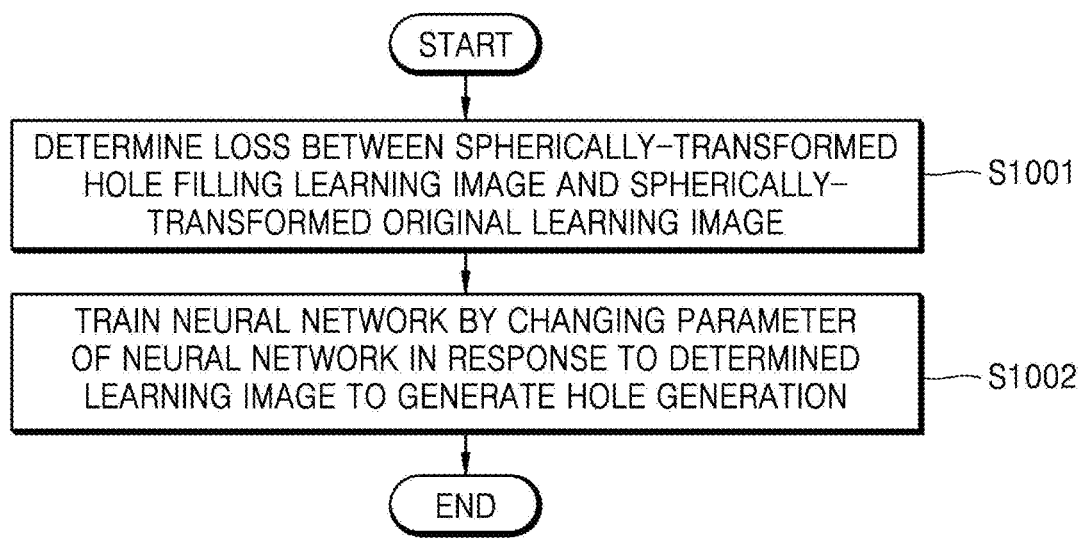
FIG. 10 is a view illustrating an architecture of a software module for performing training of a neutral network according to an embodiment.
Figure 11:
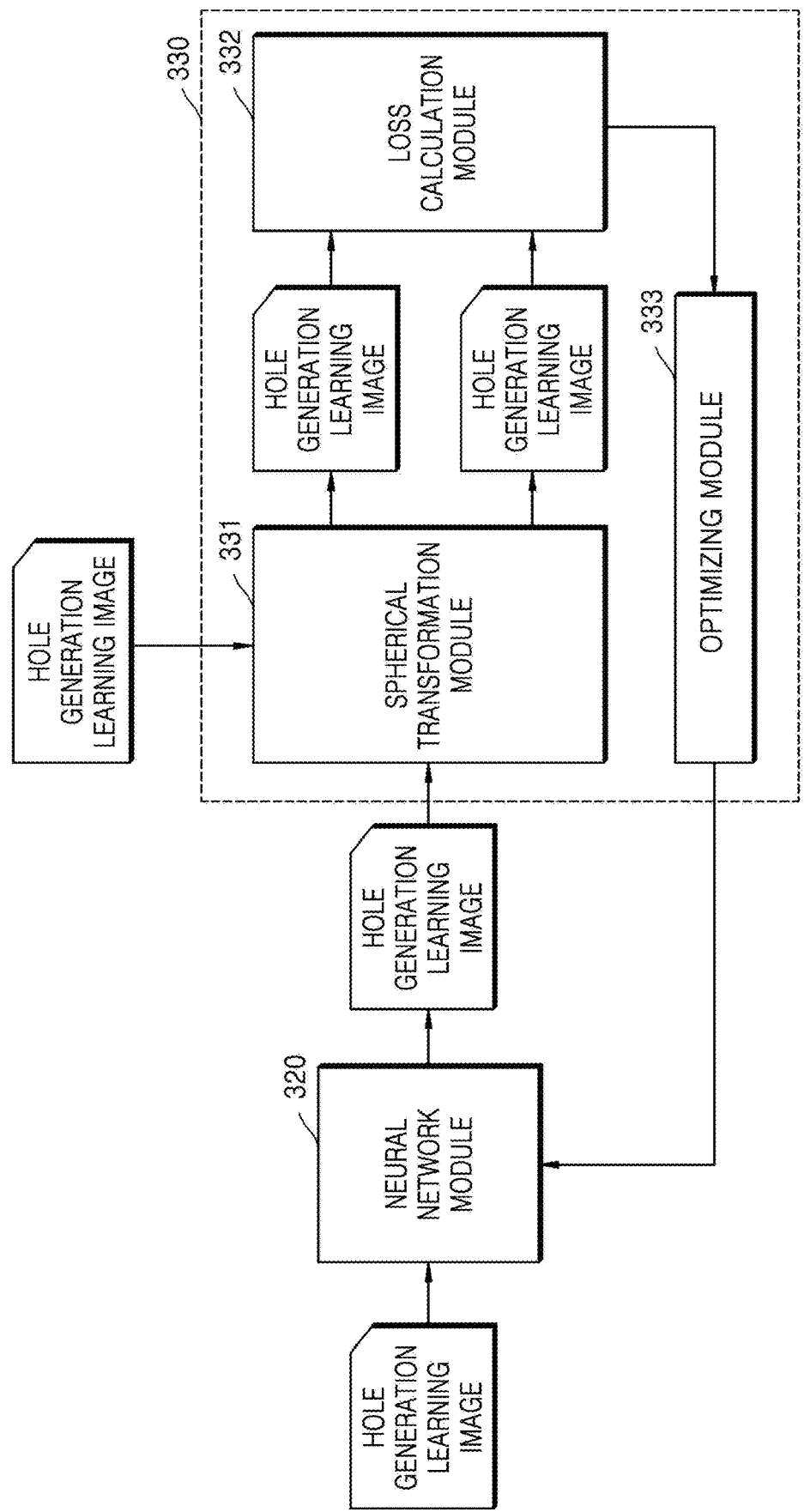
FIG. 11 is a flowchart illustrating a training process of a neural network for hole filling according to an embodiment.

FIG. 10 is a view illustrating an architecture of a software module for performing training of a neutral network according to an embodiment, and FIG. 11 is a flowchart illustrating a training process of a neural network for hole filling according to an embodiment. Hereinafter, an embodiment of the training module 330 will be described in more detail with reference to FIGS. 10 and 11.

Referring to FIG. 10, the training module 330 may include a spherical transformation module 331, a loss calculation module 332, and an optimizing module 333.

The spherical transformation module 331 may spherically transform the hole filling learning image and the hole generation learning image. For example, the hole filling learning image and the hole generation learning image may be an equirectangular projection panoramic image, and the spherical transformation module 331 may spherically transform the hole filling learning image and the hole generation learning image.

In FIG. 10, the original learning image spherically-transformed by the spherical transformation module 331 is indicated by an 'original learning image*', and the spherically-transformed hole filling learning image is indicated by a 'hole filling learning image*'.

In an example, the spherical transformation module 331 may perform spherical transformation by using Equation 1 below. Spherical transformation may be converted by using equations or algorithms in addition to Equation 1 below.

$$[\psi \star f](R) = \langle L_R \psi, f \rangle = \int_{S^2} \sum_{k=1}^{K} \psi_k(R^{-1}x) f_k(x) dx. \quad \text{[Equation 1]}$$

The loss calculation module 332 may calculate a loss between the spherically-transformed hole filling learning image (hole filling learning image*) and the spherically-transformed original learning image(original learning image*) (S1101).

That is, the loss calculation module 332 may quantify the difference between the spherically-transformed hole filling learning image and the spherically-transformed original learning image as a loss value. In an example, the loss value determined by the loss calculation module 332 may be set in the range between 0 and 1.

The optimizing module 333 may receive the loss calculated from the loss calculation module 332 and may perform optimizing by changing parameters of the neural network in response to the loss (S1103).

In an example, the optimizing module 333 may perform optimizing by adjusting a weight value parameter W of the neural network. In another example, the optimizing module 333 may perform optimizing by adjusting at least one of the weight value parameter W and bias b of the neural network.

Various types of optimizing methods may be applied to the optimizing module 333. For example, the optimizing module 333 may perform optimizing by using batch gradient descent, stochastic gradient descent, mini-batch gradient descent, momentum, Adagrad, RMSprop, or the like.

Figure 12:
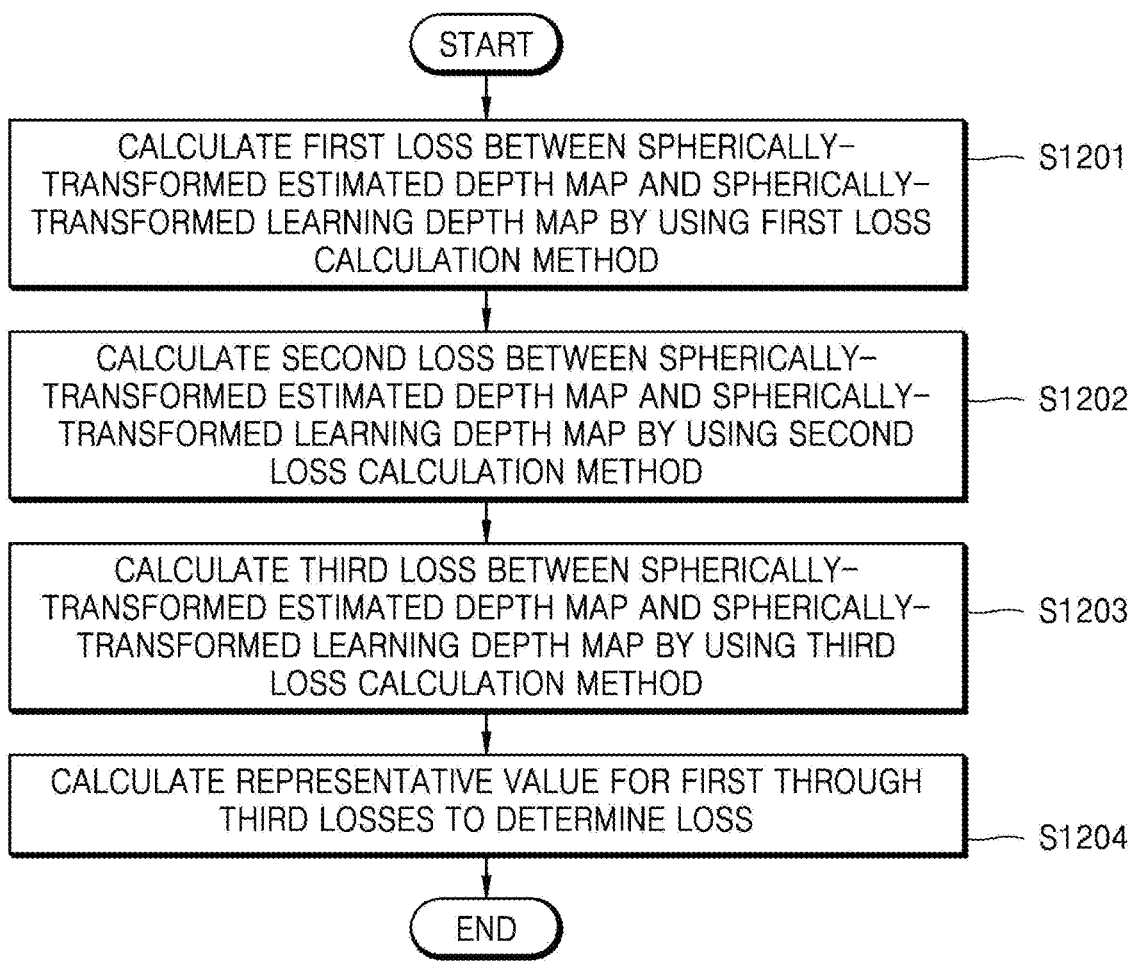
FIG. 12 is a flowchart illustrating a loss calculating process for training of a neural network according to an embodiment.

FIG. 12 is a flowchart illustrating a loss calculation process for training of a neural network according to an embodiment.

In an embodiment shown in FIG. 12, the loss calculation module 332 may apply a plurality of loss calculation methods and may calculate a representative value from resultant values thereof to determine a loss.

Referring to FIG. 12, the loss calculation module 332 may calculate a first loss function result between a spherically-transformed estimated depth map and a spherically-transformed learning depth map by using a first loss calculation method.

Equation 2 below is an equation for describing an example of a first loss calculation equation.

$$RMSE = \sqrt{\frac{1}{T}\sum_{i}\|y_i - y_i^*\|^2} \quad \text{[Equation 2]}$$

Here, T is the number of samples, y is a learning depth map, and y* is an estimated depth map.

The loss calculation module 332 may calculate a second loss function result between a spherically-transformed estimated depth map and a spherically-transformed learning depth map by using a second loss calculation method.

Equation 3 below is an equation for describing an example of a second loss calculation equation.

$$SILog = \frac{1}{T}\sum_{i}d_i^2 - \frac{1}{T^2}\left(\sum_{i}d_i\right)^2 \quad \text{[Equation 3]}$$

Here, T is the number of samples, and d is a difference between a learning depth map and an estimated depth map in a log space.

The loss calculation module 332 may calculate a third loss function result between a spherically-transformed estimated depth map and a spherically-transformed learning depth map by using a third loss calculation method.

Equation 4 below is an equation for describing an example of a third loss calculation equation.

$$L2LossFunction = \sum_{i=1}^{n}(y_{true} - y_{predicted})^2 \quad \text{[Equation 4]}$$

Here, $y_{true}$ is a learning depth map, and $y_{predicted}$ is an estimated depth map.

The loss calculation module 332 may calculate a representative value for first through third loss function results to determine the representative value as a loss (S1204). Here, an average, a median, a mode, etc. may be applied as representative values.

Figure 13:
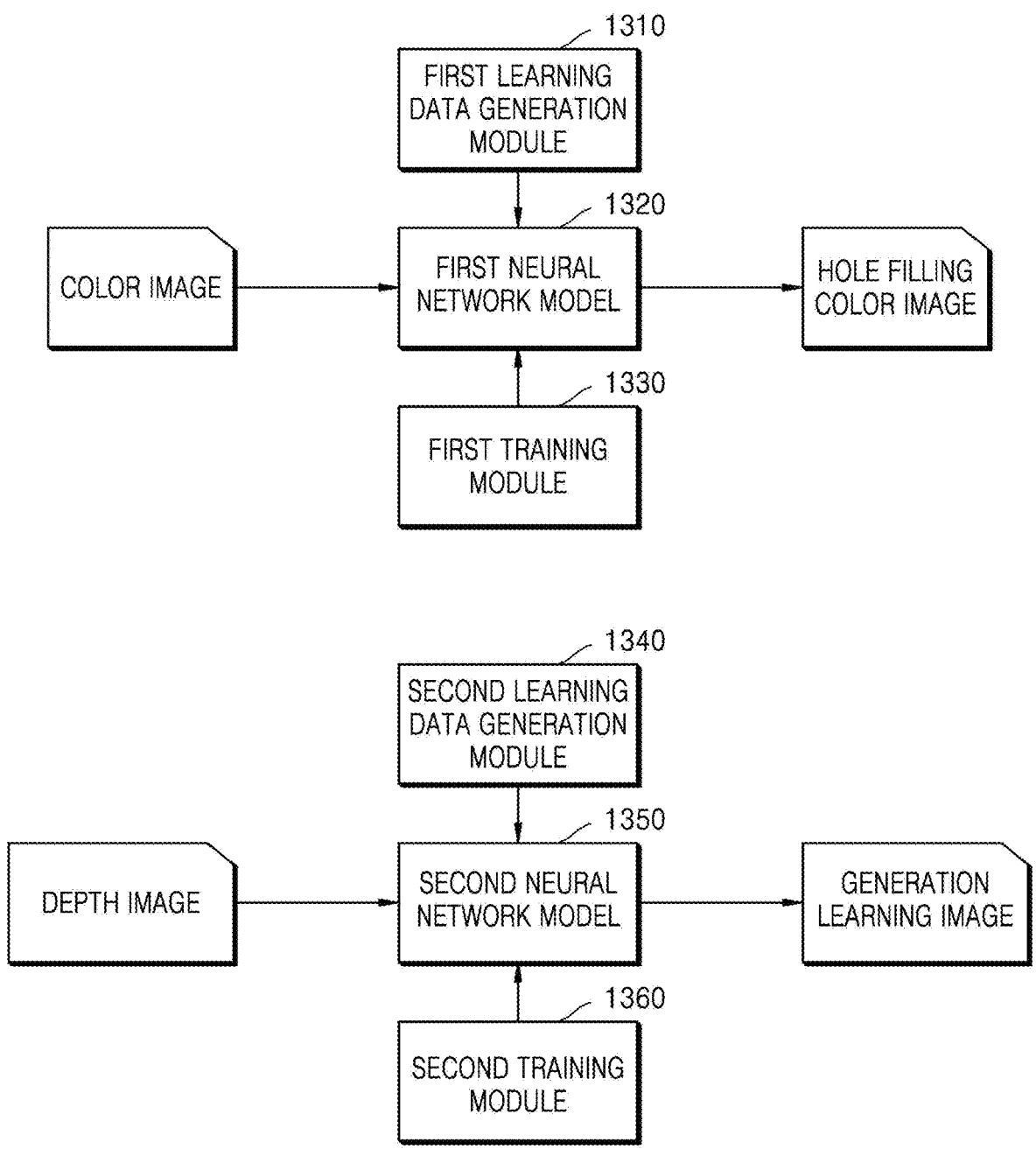
FIG. 13 is a view illustrating an architecture of a software module for performing hole filling according to another embodiment.

FIG. 13 is a view illustrating an architecture of a software module for performing hole filling according to another embodiment.

In FIGS. 3 through 12, one neural network model is assumed. However, as in an embodiment of FIG. 13, the software module may include neural networks 1320 and 1350 for each of the color image and the depth map image, learning data generation modules 1310 and 1340 that operate in association with the neural network models 1320 and 1350, and training modules 1330 and 1360.

That is, the first neural network model 1320 may receive a color image as a query image and may perform hole filling therefor, thereby outputting a hole filling color image as a response image by performing hole filling thereon. The first learning data generation module may receive the original color image and may generate learning data for original color image and may provide the generated learning data to the first neural network model. The first training module 1330 may compare a hole filling color image output from the neural network model 1320 with the original color image, thereby learning the first neural network module 1320.

The second neural network model 1350, the second learning data generation module 1340, and the sixth training module 1360 may perform the above-described operation based on the depth map image.

Figure 14A:
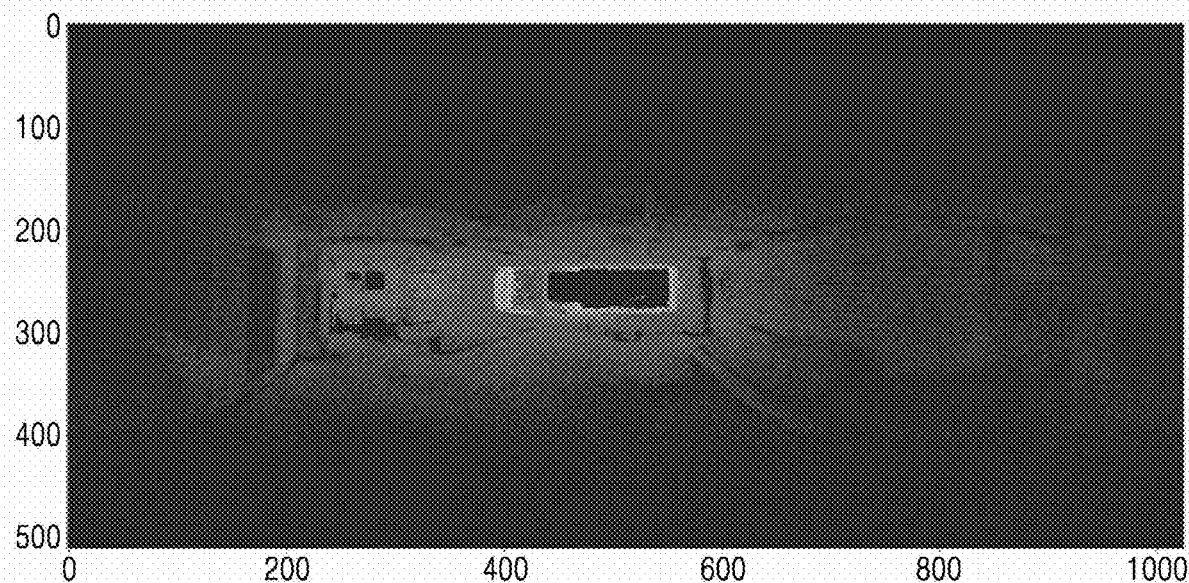
FIGS. 14A and 14B are views illustrating comparisons of a depth map image before hole filling is performed with a depth map image after hole filling is performed, according to an embodiment.
Figure 14B:
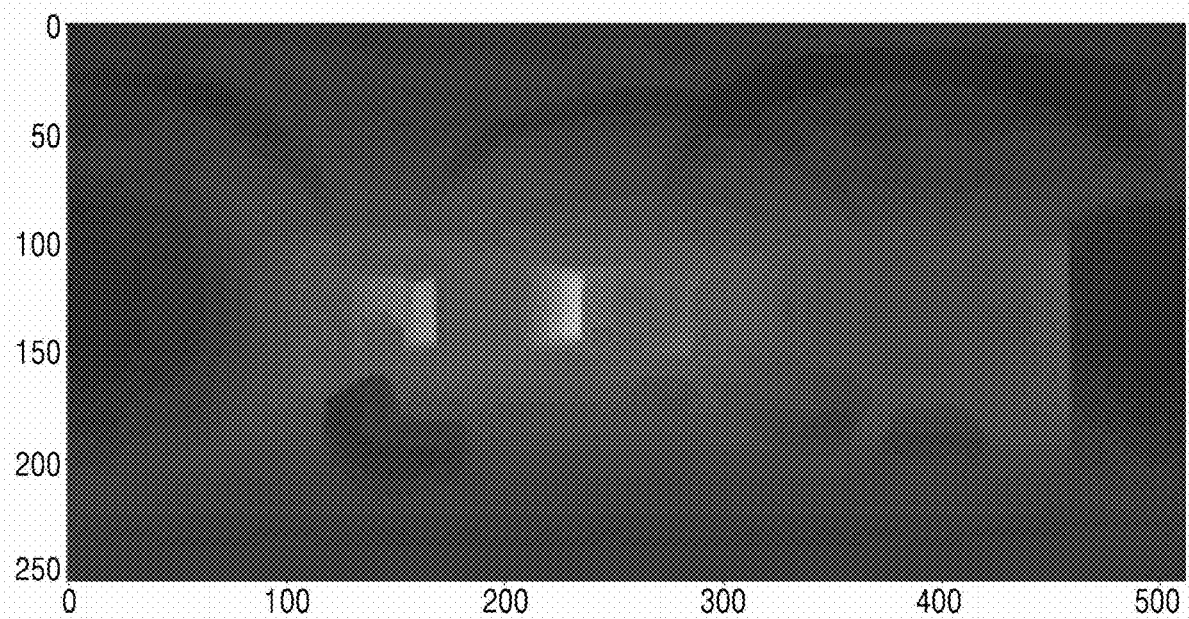

FIGS. 14A and 14B are views illustrating comparisons of a depth map image before hole filling is performed, with a depth map image after hole filling is performed, according to an embodiment, and FIG. 14A illustrates an example of an input depth map image before hole filling is performed. FIG. 14A shows an image captured by a smartphone, and an upper region and a lower region are indicated as a wide hole. FIG. 14B illustrates an example of a hole filling depth map image output by the second neural network model 1350, and the hole in the upper region and the lower region is filled.

Figure 15:
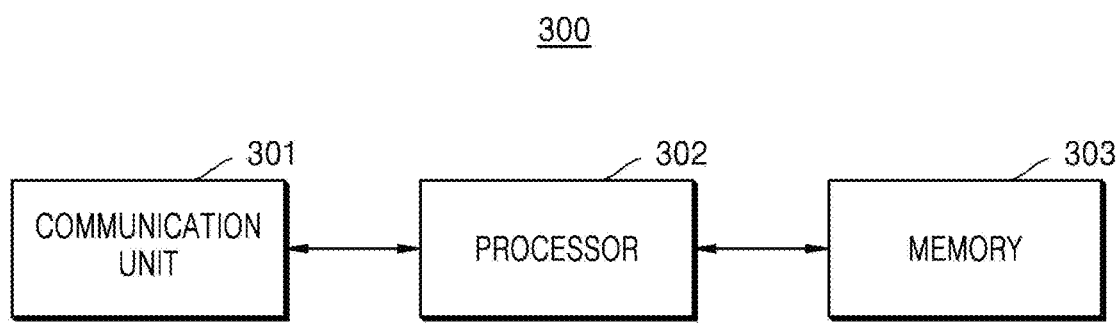
FIG. 15 is a block diagram illustrating the configuration of a computing device according to an embodiment.

FIG. 15 is a block diagram for describing a computing device according to an embodiment.

As shown in FIG. 10, an electronic device 300 according to an embodiment may include a communication unit 310, a memory 302, and a processor 303. However, such a configuration is illustrative, and a new configuration may be added or some configuration may be omitted in addition to such a configuration in carrying out the present disclosure.

The communication unit 301 may include a circuit and may perform communication with an external device (including a server). In detail, the processor 303 may receive various data or information from an external device connected through the communication unit 301, and may also transmit various data or information to the external device.

The communication unit 301 may include at least one of a WiFi module, a Bluetooth module, a wireless communication module, and a near field communication (NFC) module, and may perform communication according to various communication standards such as IEEE, Zigbee, 3rd Generation (3G), 3rd Generation Partnership Project (3GPP), Long Term Evolution (LTE), 5th Generation (5G), and the like.

At least one instruction related to the electronic device 300 may be stored in the memory 302. An operating system (O/S) for driving the electronic device 300 may be stored in the memory 302. Also, various types of software programs or applications for operating the electronic device 100 may be stored in the memory 302 according to various embodiments. The memory 302 may include a semiconductor memory such as a flash memory, or a magnetic storage medium such as a hard disk.

In detail, various types of software modules for operating the electronic device 100 may be stored in the memory 302 according to various embodiments, and the processor 303 may control the operation of the electronic device 100 by executing various types of software modules stored in the memory 302. That is, the memory 302 may be accessed by the processor 303, and reading/recording/correcting/deleting/updating of data may be performed by the processor 303.

In various embodiments of the present disclosure, a neural network model according to the present disclosure may be stored in the memory 302, and a software module such as a learning data generation module and a training module may be stored in the memory 302.

In addition, various information required within the scope for achieving the objective of the present disclosure may be stored in the memory 302, and the information stored in the memory 302 may be updated as the information is received from an external device or input by the user.

The processor 303 may control the overall operation of the electronic device 300. In detail, the processor 303 may be connected to the configuration of the electronic device 300 including the communication unit 301 and the memory 302 described above, and may execute at least one instruction stored in the memory 303 described above to control the overall operation of the electronic device 100.

The processor 303 may be implemented in various manners. For example, the processor 303 may be implemented as at least one of an Application Specific Integrated Circuit (ASIC), an embedded processor, a microprocessor, a hardware control logic, a hardware Finite State Machine (FSM), and a Digital Signal Processor (DSP). The term 'the processor 303' in the present disclosure may be used to encompass a Central Processing Unit (CPU), a Graphic Processing Unit (GPU), and a Main Processing Unit (MPU).

Various embodiments according to the present disclosure based on control of the processor 303 have been described above with reference to FIGS. 1 through 14 and thus, a redundant description therewith is omitted.

A control method performed by the electronic device 300 according to the above-described embodiment may be implemented with a program and may be provided to the electronic device 300. In particular, a program including the control method of the electronic device 300 may be stored in a non-transitory computer readable medium.

As described above, the control method of the electronic device 100 and the computer-readable recording medium including a program for executing the control method of the electronic device 100 have been briefly described. However, this is only for omitting redundant description, and various embodiments of the electronic device 100 may be applied to the control method of the electronic device 100 and the computer-readable recording medium including a program for executing the control method of the electronic device 100.

Functions related to the neural network according to the present disclosure are operated through the processor 303 and the memory 302. The processor 130 may include one or a plurality of processors 303. In this case, one or a plurality of processors 303 may be general-purpose processors such as CPUs, APs, DSPs, etc., graphics-only processors such as Graphic Processing Units (GPUs) or Vision Processing Units (VPUs), or artificial intelligence-only processors such as Neural Processing Units (NPUs). One or a plurality of processors 303 may control to process input data according to a predefined operation rule or neural network model stored in the memory 120. Alternatively, when one or a plurality of processors 303 are artificial intelligence-only processors, the artificial intelligence-only processor may be designed with a hardware structure specialized for processing a specific neural network model.

The predefined operation rule or neural network model is characterized in that it is created through learning. Here, being made through learning means that a basic neural network model is learned using a plurality of learning data by a learning algorithm, so that a predefined operation rule or neural network model set to perform a desired characteristic (or purpose) is created. Such learning may be performed in a device itself on which artificial intelligence according to the present disclosure is performed, or may be performed through a separate server and/or system. Examples of learning algorithms include supervised learning, unsupervised learning, semi-supervised learning, or reinforcement learning. However, embodiments are not limited to the above-described example.

The neural network model may include a plurality of neural network layers. Each of the plurality of neural network layers may have a plurality of weight values, and a neural network operation may be performed through an operation between an operation result of a previous layer and a plurality of weight values. The plurality of weight values of the plurality of neural network layers may be optimized by the learning result of the neural network model. For example, a plurality of weight values may be updated so that a loss value or a cost value obtained from the neural network model during a learning process may be reduced or minimized. The neural network may include a Deep Neural Network (DNN), for example, a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), or Deep Q-Networks, etc. However, embodiments are not limited to the above-described example.

A device-readable storage medium may be provided in the form of a non-transitory storage medium. Here, the 'non-transitory storage medium' is a tangible device and only means that it does not include signals (e.g., electromagnetic waves). The term does not distinguish the case where data is semi-permanently stored in the storage medium and the case where data is temporarily stored in the storage medium. In an example, the 'non-transitory storage medium' may include a buffer in which data is temporarily stored.

According to the present application, there are one or more of the following effects.

According to an embodiment disclosed in the present application, hole filling for a panoramic image itself used to construct a virtual 3D model can be provided.

According to an embodiment disclosed in the present application, training is performed by reflecting the spherical transformed state so that the hole filling for the panoramic image can be more accurately filled when used in the virtual 3D model.

According to an embodiment disclosed in the present application, even when an unnecessary object such as a person is deleted in configuring a virtual 3D model for an existing indoor space, a hole generated thereby can be efficiently and accurately filled.

According to an embodiment disclosed in the present application, a plurality of functions are used in combination in calculating a loss used for learning a neural network so that the loss range can be reduced to a minimum.

Effects of the present application are not limited to the effects mentioned above, and other unmentioned effects will be clearly understood by those skilled in the art from the description of the claims.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A hole filling method for providing a virtual three-dimensional (3D) model, the hole filling method being executable on a computing device and comprising:
   acquiring an original learning image and a hole generation learning image for the original learning image, wherein the hole generation learning image is an image in which at least one hole is generated based on the original learning image;
   generating a hole filling learning image by performing hole filling on the hole generation learning image by using a neural network;
   performing a spherical transformation on each of the hole filling learning image and the original learning image; and
   training the neural network based on a difference between the spherically-transformed hole filling learning image and the spherically-transformed original learning image.

2. The hole filling method of claim 1, further comprising:
   receiving a query image; and
   inputting the query image to the trained neural network and outputting a hole filling image output from the trained neural network as a response image to the query image.

3. The hole filling method of claim 1,
   wherein the acquiring of the hole generation learning image comprises:
   acquiring the original learning image; and
   generating the hole generation learning image by generating an arbitrary hole in an upper region or a lower region of the original learning image.

4. The hole filling method of claim 1,
   wherein the acquiring of the hole generation learning image comprises:
   acquiring the original learning image; and
   generating the hole generation learning image by generating a hole having a size less than or equal to a preset size at a random position of the original learning image.

5. The hole filling method of claim 1,
   wherein the training of the neural network comprises:
   determining a loss between the spherically-transformed hole filling learning image and the spherically-transformed original learning image; and
   training the neural network by changing a parameter of the neural network in response to the determined loss.

6. The hole filling method of claim 1,
   wherein the original learning image is one of a color image and a depth map image.

7. The hole filling method of claim 1,
   wherein the original learning image is an equirectangular projection panoramic image.

8. A computing device comprising:
   a memory storing one or more instructions; and
   a processor configured to execute the one or more instructions stored in the memory,
   wherein the processor is configured to execute the one or more instructions to acquire an original learning image and a hole generation learning image for the original learning image, wherein the hole generation learning image is an image in which at least one hole is generated based on the original learning image,
   to generate a hole filling learning image by performing hole filling on the hole generation learning image by using a neural network, to perform a spherical transformation on each of the hole filling learning image and the original learning image, and to train the neural network based on a difference between the spherically-transformed hole filling learning image and the spherically-transformed original learning image.

9. The computing device of claim 8,
wherein the processor is further configured to execute the one or more instructions to receive a query image to the trained neural network and to output a hole filling image output from the neural network as a response image for the query image.

10. The computing device of claim 8,
wherein the processor is further configured to execute the one or more instructions to generate the hole generation learning image by generating an arbitrary hole in an upper region or a lower region of the original learning image.

11. The computing device of claim 8,
wherein the processor is further configured to execute the one or more instructions to generate the hole generation learning image by generating a hole having a size less than or equal to a preset size at a random position of the original learning image.

12. The computing device of claim 8,
wherein the processor is further configured to execute the one or more instructions to determine a loss between the spherically-transformed hole filling learning image and the spherically-transformed original learning image, and to train the neural network by changing a parameter of the neural network in response to the determined loss.

13. The computing device of claim 8,
wherein the processor is further configured to execute the one or more instructions to determine a loss between the spherically-transformed hole filling learning image and the spherically-transformed original learning image, and to train the neural network by changing a parameter of the neural network in response to the determined loss.

14. The computing device of claim 8,
wherein the processor comprises:
a first module configured to train a first neural network on a color image and to generate a hole filling color image by using the first neural network; and
a second module configured to train a second neural network on a depth map image and to generate a hole filling depth map image by using the second neural network.

15. A non-transitory storage medium on which computer-readable instructions are stored,
wherein, when the computer-readable instructions are executed by a computing device, the computer-readable instructions allow the computing device to perform operations of:
acquiring an original learning image and a hole generation learning image for the original learning image, wherein the hole generation learning image is an image in which at least one hole is generated based on the original learning image;
generating a hole filling learning image by performing hole filling on the hole generation learning image by using a neural network;
performing spherical transformation on each of the hole filling learning image and the original learning image; and
training the neural network based on a difference between the spherically-transformed hole filling learning image and the spherically-transformed original learning image.

* * * * *